(No Model.)
C. CARR.
FARINA COOKER.
No. 305,047. Patented Sept. 16, 1884.
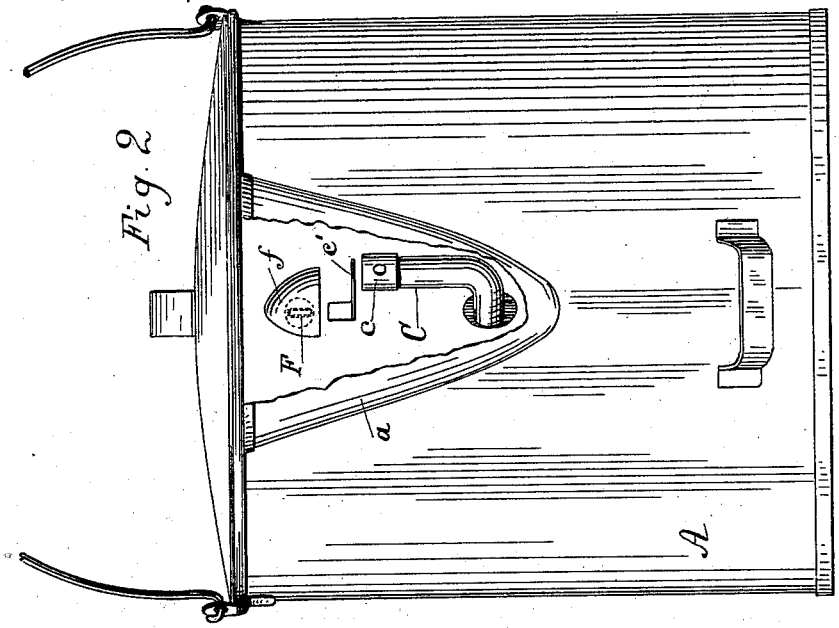
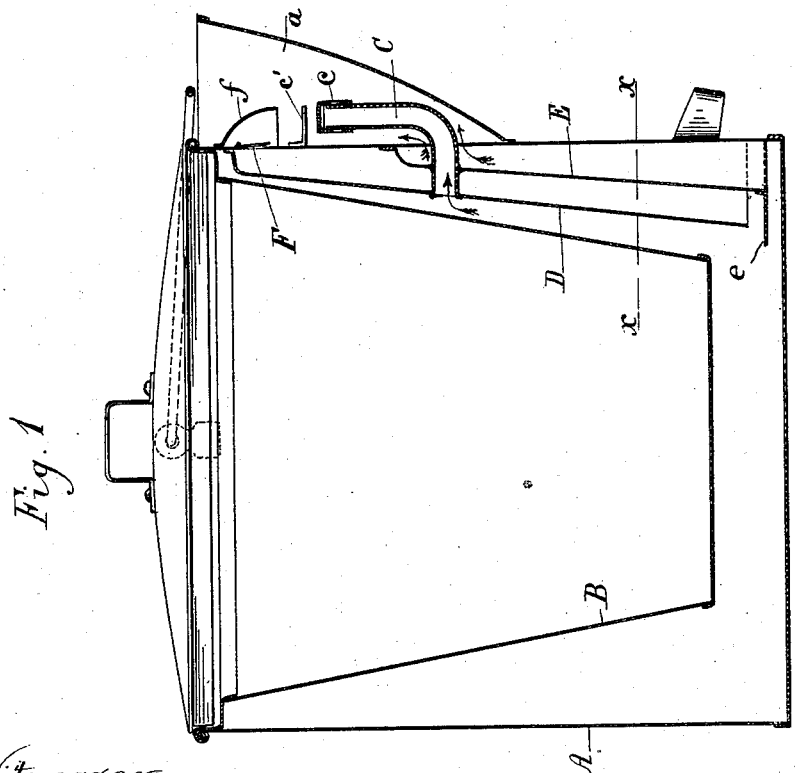
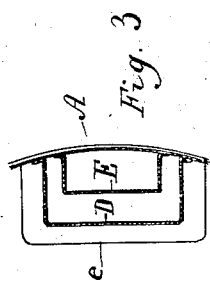
Witnesses:
I. Lorum
C. C. Linthicum
Inventor:
Charles Carr
By Banning & Banning,
Attorneys.

UNITED STATES PATENT OFFICE.

CHARLES CARR, OF HYDE PARK, ILLINOIS.

FARINA-COOKER.

SPECIFICATION forming part of Letters Patent No. 305,047, dated September 16, 1884.

Application filed February 11, 1884. (No model.)

*To all whom it may concern:*

Be it known that I, CHARLES CARR, of Hyde Park, Cook county, Illinois, have invented certain new and useful Improvements in Farina-Cookers, of which the following is a specification.

My invention is designed to furnish a vessel in which to cook farina, oatmeal, and other articles of food, said vessel having two compartments—one within the other—the lower designed to hold a body of water and the other to contain the article to be cooked; and the invention consists in the construction and combination of parts hereinafter described.

In a cooking utensil of this kind it is impossible to know the amount of water in the lower compartment unless the upper one be removed, except by providing indicators of some sort; and my invention consists, principally, in constructing such utensil with an alarm-whistle or indicator, whereby the cook may always know when the water is low.

In the accompanying drawings, Figure 1 is a vertical sectional view of the device. Fig. 2 is a perspective view of the same, and Fig. 3 is a section taken on line $x\ x$, Fig. 1.

The outside vessel, A, is provided with a spout, $a$, through which water is admitted, and which forms a covering or guard for the exposed portion of the parts hereinafter described. Within vessel A is fitted an interior vessel, B, having a flanged top, $b$, which is soldered to the top of vessel A. A bent tube, C, passes through the shell of vessel A and through the tubes hereinafter described. This tube C is located in the throat of spout $a$, and forms a communication with the interior of vessel A. Its upper end terminates below the top of spout $a$, and a cap, $c$, is loosely fitted over its end. The object of this bent pipe is to permit of the escape of steam from the lower vessel, and a cap on the top of the pipe is designed to regulate the amount of steam-pressure within the vessel. To prevent this cap from being lifted entirely off the pipe, a stop, $c'$, is fastened to the side of the vessel. A pipe, D, is soldered to the inside of vessel A, just back of spout $a$, its upper end being inclosed and extended nearly or quite to the top of the vessel, and its lower end being open and terminating half an inch from the bottom of the vessel. Inclosed by pipe D is a shorter pipe, E, of similar from, its upper end being inclosed and terminating just above the point where the bent pipe C pierces it, and its lower end being open and terminating, say, half-way between the lower end of pipe D and the bottom of vessel A. The lower end of pipe E is provided with a flange, $e$, which extends out on all sides of said pipe and beyond pipe D. The object of this flange is to prevent the boiling water from bubbling or spurting into the pipe D and escaping through the reed or whistle. The inside tube is a continuation of the spout by which the water is admitted into the vessel, and it prevents the escape of the steam through said spout. A reed or whistle, F, is placed in the shell of vessel A at the upper end of pipe D, the object of which is to sound an alarm when the water is low in the vessel. A hood or cap-piece, $f$, is placed over the reed to protect the latter from injury.

In operation the lower vessel is supplied with water through the pipe $a$. As the water boils, the steam passes off through the bent pipe C, its pressure being regulated by the weight of cap $c$. As the water boils away and falls below the lower end of pipe D, the steam will pass into the interior of this pipe, escaping through the reed F, and will cause it to sound an alarm. As the alarm will begin to sound as soon as the water reaches the lower end of pipe D, considerable time will elapse between the first alarm and the exhaustion of the water.

The meritorious features of this invention are: First, the whistle and tubes leading thereto are located inside of the outer shell out of the way; second, the construction and arrangement of parts is compact and exceedingly simple, and they are not liable to get out of order; and, third, the automatic alarm is almost perfect in its operation.

I claim—

1. The combination, in a cooking utensil, of an exterior vessel, A, having a spout, $a$, communicating with the pipe E, an interior vessel, B, a steam-pipe, C, and an escape-pipe, D, provided with a suitable alarm-whistle, all substantially as described, and for the purpose set forth.

2. The combination, in a cooking utensil, of the vessels A and B, bent pipe C, and pipes D and E, the latter having a flange, $e$, with a reed or whistle, F, substantially as described, and for the purpose set forth.

CHARLES CARR.

Witnesses:
THOMAS CARR,
C. C. LINTHICUM.